(12) United States Patent
Diekhans et al.

(10) Patent No.: US 7,756,624 B2
(45) Date of Patent: Jul. 13, 2010

(54) ROUTE PLANNING SYSTEM FOR AGRICULTURAL WORKING MACHINES

(75) Inventors: Norbert Diekhans, Guetersloh (DE); Andreas Brunnert, Rietberg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 11/566,791

(22) Filed: Dec. 5, 2006

(65) Prior Publication Data
US 2007/0135190 A1 Jun. 14, 2007

(30) Foreign Application Priority Data
Dec. 8, 2005 (DE) .................. 10 2005 059 003

(51) Int. Cl.
*G01C 21/00* (2006.01)
*G01C 21/30* (2006.01)
*G01C 22/00* (2006.01)
(52) U.S. Cl. .................. 701/50; 701/202; 701/209; 701/26; 460/114
(58) Field of Classification Search .................. 701/50, 701/209, 202, 26; 460/114
See application file for complete search history.

(56) References Cited

U.S. PATENT DOCUMENTS

| | | | | |
|---|---|---|---|---|
| 5,282,389 A | * | 2/1994 | Faivre et al. ............. | 73/861.73 |
| 5,575,316 A | * | 11/1996 | Pollklas ..................... | 141/198 |
| 6,128,574 A | * | 10/2000 | Diekhans .................... | 701/209 |
| 6,216,071 B1 | * | 4/2001 | Motz ........................... | 701/50 |
| 6,682,416 B2 | * | 1/2004 | Behnke et al. ............. | 460/114 |
| 6,732,024 B2 | * | 5/2004 | Rekow et al. ............... | 701/26 |
| 6,760,654 B2 | * | 7/2004 | Beck ........................... | 701/50 |
| 6,990,399 B2 | * | 1/2006 | Hrazdera et al. ............. | 701/50 |
| 7,010,425 B2 | * | 3/2006 | Gray et al. .................. | 701/202 |
| 7,110,881 B2 | * | 9/2006 | Gray et al. .................. | 701/209 |
| 7,216,033 B2 | * | 5/2007 | Flann et al. ................. | 701/202 |
| 7,228,214 B2 | * | 6/2007 | Flann et al. .................. | 701/50 |

FOREIGN PATENT DOCUMENTS

| | | |
|---|---|---|
| DE | 196 29 618 | 1/1998 |
| WO | 00/35265 | 6/2000 |

* cited by examiner

*Primary Examiner*—Khoi Tran
*Assistant Examiner*—Ian Jen
(74) *Attorney, Agent, or Firm*—Michael J. Striker

(57) ABSTRACT

A route planning system for an agricultural working machine including at least one crop material storage unit for storing quantities of crop material transferable to forage vehicles, has a unit for generating driving routes in a territory based on a defined working width assigned to the agricultural working machine, a unit for reconciling a crop material quantity stored in the crop material storage unit depending on at least one characteristic parameter, and a unit for dynamically adapting the reconciliation to changes in the at least one characteristic parameter.

19 Claims, 3 Drawing Sheets

ROUTE PLANNING SYSTEM FOR AGRICULTURAL WORKING MACHINES

CROSS-REFERENCE TO A RELATED APPLICATION

The invention described and claimed hereinbelow is also described in German Patent Application DE 10 2005 059 003.9 filed on Dec. 8, 2005. This German Patent Application, whose subject matter is incorporated here by reference, provides the basis for a claim of priority of invention under 35 U.S.C. 119(a)-(d).

BACKGROUND OF THE INVENTION

The present invention relates to a route planning system for agricultural working machines.

Publication DE 196 29 618 makes known a route planning system for combine harvesters, which, in the route plan that was determined, displays the positions of the combine harvester at which the grain tank of the combine harvester will probably be filled. To determine the grain tank fill level, the information is evaluated by throughput and fill level sensors, and the point in time when the grain tank will be completely filled is approximated with consideration for the grain tank volume. Systems of this type have the particular disadvantage that they determine the particular unloading position based on fixedly predefined driving routes of the route planning system. If the combine harvester deviates from these predefined driving routes, e.g., to avoid obstacles, the system is no longer capable of stating a reasonable unloading position, since the combine harvester subsequently travels along driving routes that the route planning system does not know. In addition, systems of this type do not permit interactions between a large number of combine harvesters and the unloading vehicles assigned to them.

In contrast, publication WO 00/35265 discloses a machine management system which coordinates and monitors the harvesting and transport activities of a large number of harvesting machines and forage vehicles. In one embodiment, a computation algorithm is provided which determines the position of the combine harvester at which the grain tank will probably be filled. This likely unloading position is transmitted to an unloading vehicle, so it can begin moving toward the likely unloading position. The main disadvantage of such systems is that the geometric position of the likely unloading point is determined soley based on the throughput and/or grain fill level which were determined, and that geographic conditions of the field are not taken into account. As a result, it is possible that a point on the field will be determined to be the unloading position, but it will not be possible to move the unloading vehicle into this position relative to the combine harvester. Situations like this always result when the precalculated unloading point is located at the end of the field or in an area blocked by obstacles such as telephone poles or trees. In these cases, the coordination function fails, and the drivers of the machines must determine their positions in a conventional manner, i.e., by sight.

SUMMARY OF THE INVENTION

The task of the present invention, therefore, is to avoid the disadvantages of the related art and provide a route planning system which takes changing external conditions into account in a flexible manner.

In keeping with these objects and with others which will become apparent hereinafter, one feature of the present invention resides, briefly stated, in a route planning system for an agricultural working machine including at least one crop material storage unit for storing quantities of crop material transferable to forage vehicles, the route planning system comprising means for generating driving routes in a territory based on a defined working width assigned to the agricultural working machine; means for reconciling a crop material quantity stored in the crop material storage unit depending on at least one characteristic parameter; and means for dynamically adapting the reconciliation to changes in the at least one characteristic parameter.

Given that the crop material quantity stored in the crop material storage unit is reconciled depending on at least one characteristic parameter, and the reconciliation is adjusted dynamically based on changes to the at least one characteristic parameter, it is ensured that the route planning system is flexibly adaptable to changing conditions.

In an advantageous embodiment of the present invention, the characteristic parameters are crop material-specific and/or field-specific and/or machine-specific parameters, thereby enabling the basic conditions which influence the harvesting process to be taken into account in a comprehensive manner, thereby ultimately ensuring efficient use of the incorporated machine systems.

In a further advantageous embodiment of the present invention, the crop material quantity stored by the crop material storage unit is sensed by sensors, and the crop material quantity-specific signals generated by the sensors are correlated in an evaluation unit with at least one characteristic parameter provided by the evaluation unit, and the evaluation unit generates information which reconciles the crop material quantity. A design of this type has the advantage that dynamic reconciliation can be implemented using proven technical means which have a simple design.

A great economic effect is attained with the inventive route planning system when the information which is generated by the evaluation unit and is used to reconcile the crop material quantity includes the expected crop material yields and/or the expected unloading point and/or an unloading point in time and/or a remaining distance at which the crop material quantity will be unloaded from the crop material storage unit, since these variables decisively influence a continual harvesting process which has minimal, unloading-induced standstill times.

According to a particularly efficient embodiment of the present invention, the reconcilation includes the determination of the current grain tank fill level and forecasting of the geographic position of an unloading point in a route planning system with consideration for at least one field-specific parameter. This has the particular advantage that geographic limitations of the territory to be worked can be taken into account in a comprehensive manner, so that the unloading process can take place while the combine harvester is being driven, and, when the unloading vehicle is stationary, its position can be selected such that the combine harvester has quick access to the unloading vehicle with a minimum of steering maneuvers.

In a further advantageous embodiment of the present invention, the evaluation unit determines—with consideration, at the least, for the fill level of the crop material storage unit, the unloading point which was determined, the position of at least one unloading vehicle, and a driving route which was determined—an unloading strategy which adjusts at least one of these parameters as a function of the remaining parameters.

A particularly advantageous embodiment of the present invention results when the reconciliation includes stating what additional unloading capacity is required, depending on the expected crop material quantity. In this manner it can be ensured that adequate unloading capacity is always available and unproductive waiting times are avoided.

In an advantageous embodiment, the unloading capacity required is provided as a waiting-time reconciliation such that, depending on the fill level of the crop material storage unit and/or the unloading point which was determined, at least one unloading vehicle which is the unloading capacity switches between a large number of agricultural working machines with consideration for an optimization criterium for storing crop material. The advantage of this is that the unloading capacity available in the territory to be worked can optimally alternate between the combine harvesters to be unloaded without the combine harvesters being brought to a standstill.

Given that the optimization criterium is "short driving distance of the unloading vehicle on the territory to be worked" and/or "optimal filling of the unloading vehicle" and/or "prioritization of the agricultural working machine to be approached", it is ensured that the territory to be worked is rolled over at a minimum and the machine system standstill times are minimal, both of which ensure minimal damage to the ground.

In an advantageous refinement of the present invention, the control of one or more unloading vehicles is carried out automatically depending on the unloading point which was determined. This has the advantage that the unloading vehicles can react quickly and in a highly flexible manner to the fill levels of one or more combine harvesters.

A particularly advantageous embodiment results when the at least one agricultural working machine and the at least one unloading vehicle each include at least one graphical display for visualizing the unloading point which was determined. In a case such as this, direct communication between the vehicles working together in a territory can be enabled.

To ensure that the driver can quickly locate the information in the inventive route planning system which is relevant for him, the graphical display includes the depiction of driving tracks, which are depicted differently depending on the driving-track properties. In this context, a particularly transparent display results when the graphical display of driving tracks includes, at the least, the depiction of the worked driving track and the driving track yet to be worked, which depends on the unloading point which was determined. In this case, the driver of the combine harvester receives immediate information about the distance remaining in a harvesting operation before the next unloading point is reached.

In an advantageous embodiment of the present invention, the crop material-specific parameters can include the crop material type, the crop material moisture, the crop material throughput, the grain throughput, the grain-straw ratio, or a combination of these crop material-specific parameters. A comprehensive accounting of highly diverse basic conditions is attained when the field-specified parameters include the field geometry, driving routes of a route planning system, hilly terrain, the position of obstacles, or a combination of these crop material-specific parameters. The same applies when the machine-specific parameters include the fill level of the crop material storage unit, the crop material quantity delivered to the crop material storage unit, the crop material quantity removed from the crop material storage unit, specific information about at least one forage vehicle, or a combination of these machine-specific parameters.

Given that the display of the driving tracks can also be adapted dynamically to changing basic conditions, it is ensured that the driver of the particular machine system is constantly informed about current changes.

In an advantageous embodiment of the present invention, the unloading point, the unloading point in time, and the remaining distance can be visualized—individually or in combination—in a display unit, and they can be adapted to the changes which result. This has the particular advantage that the driver of the agricultural working machine receives clearly-presented information about the unloading process, which enables him to quickly recognize changes and intervene as required by external circumstances.

The novel features of the which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
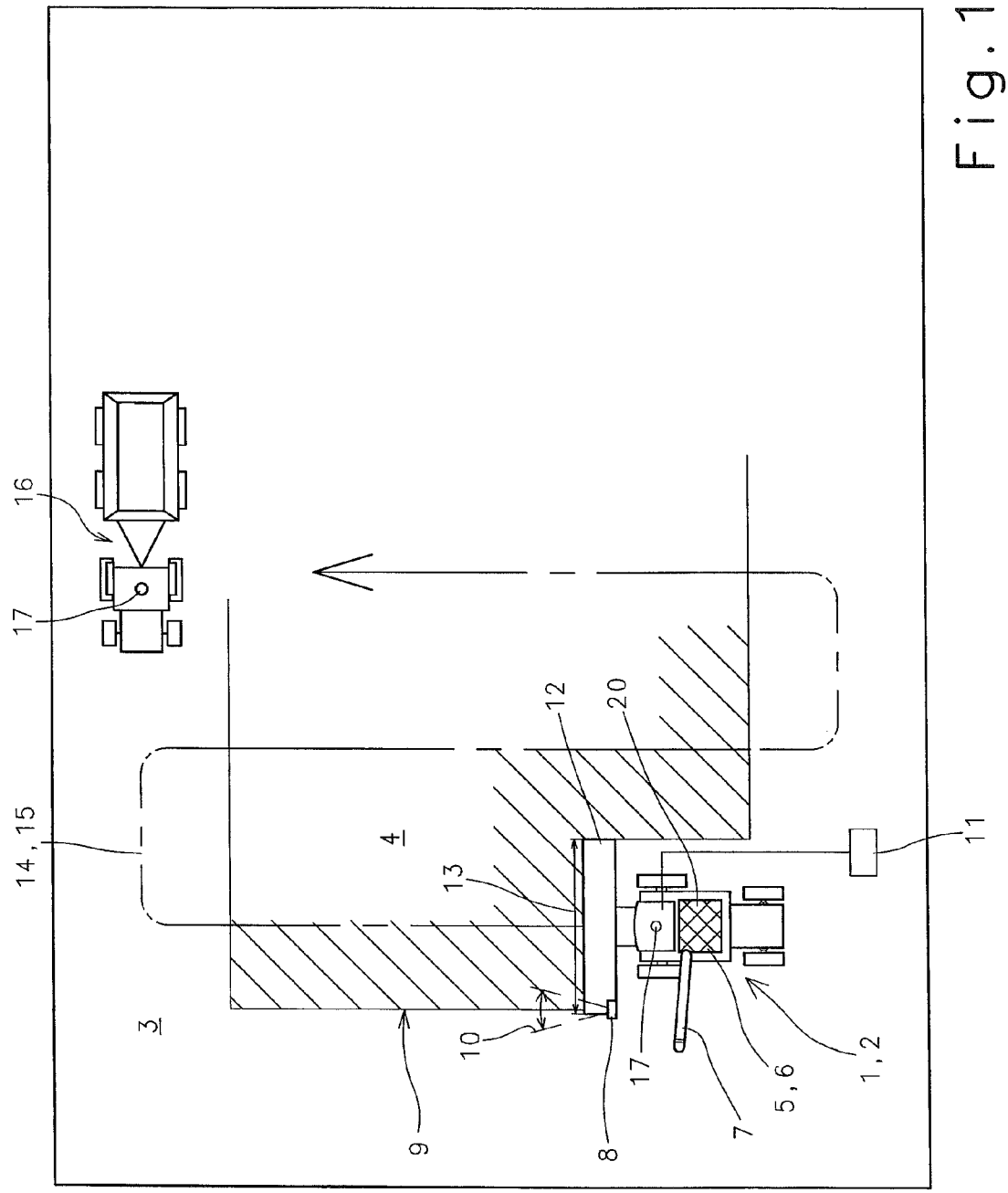
FIG. 1 shows a top view of the inventive route planning system with a combination of combine harvester and unloading vehicle.

FIG. 1 shows an agricultural working machine 1 designed as a combine harvester 2 as it harvests a crop 4 which is growing on a territory 3 to be worked. In a manner known per se, combine harvester 2 includes a crop material storage unit 6 which is designed as a grain tank 5 and stores the harvested corn, and an unloading device 7, via which grain tank 5 can be emptied. A crop edge detection device 8 is assigned to the front of combine harvester 2, which detects crop edge 9 of crop 4 to be harvested. In a manner known per se, crop edge detection device 8 can be designed as a laser sensor, the oscillating detection beam 10 of which generates a depiction of the position of crop edge 9 in an evaluation unit 11 assigned to combine harvester 2 and, with consideration for working width 13 of combine harvester 2 determined by the width of front attachment 12, generates driving routes 14 for the inventive route planning system 15, which will be described in greater detail.

To empty grain tank 5, combine harvester 2 also interacts with an unloading vehicle 16 in that combine harvester 2 approaches unloading vehicle 16 to be unloaded, or unloading vehicle 16 approaches combine harvester 2. It is also feasible that combine harvester 2 and unloading vehicle 16 include a GPS antenna 17, which transmits GPS signals 19 generated by satellite systems 18 in a manner known per se to an evaluation unit 11. Driving routes 14 of inventive route planning system 15 are generated, also depending on the working width 13 of combine harvester 2. It is within the scope of the present invention that crop edge detection device 8 and GPS-based system 17-19 can also be located on any type of agricultural working machine 1. For simplicity, the present invention will be described below essentially with reference to the complex combine harvester 2 system, although the present invention is not limited thereto.

Figure 2:
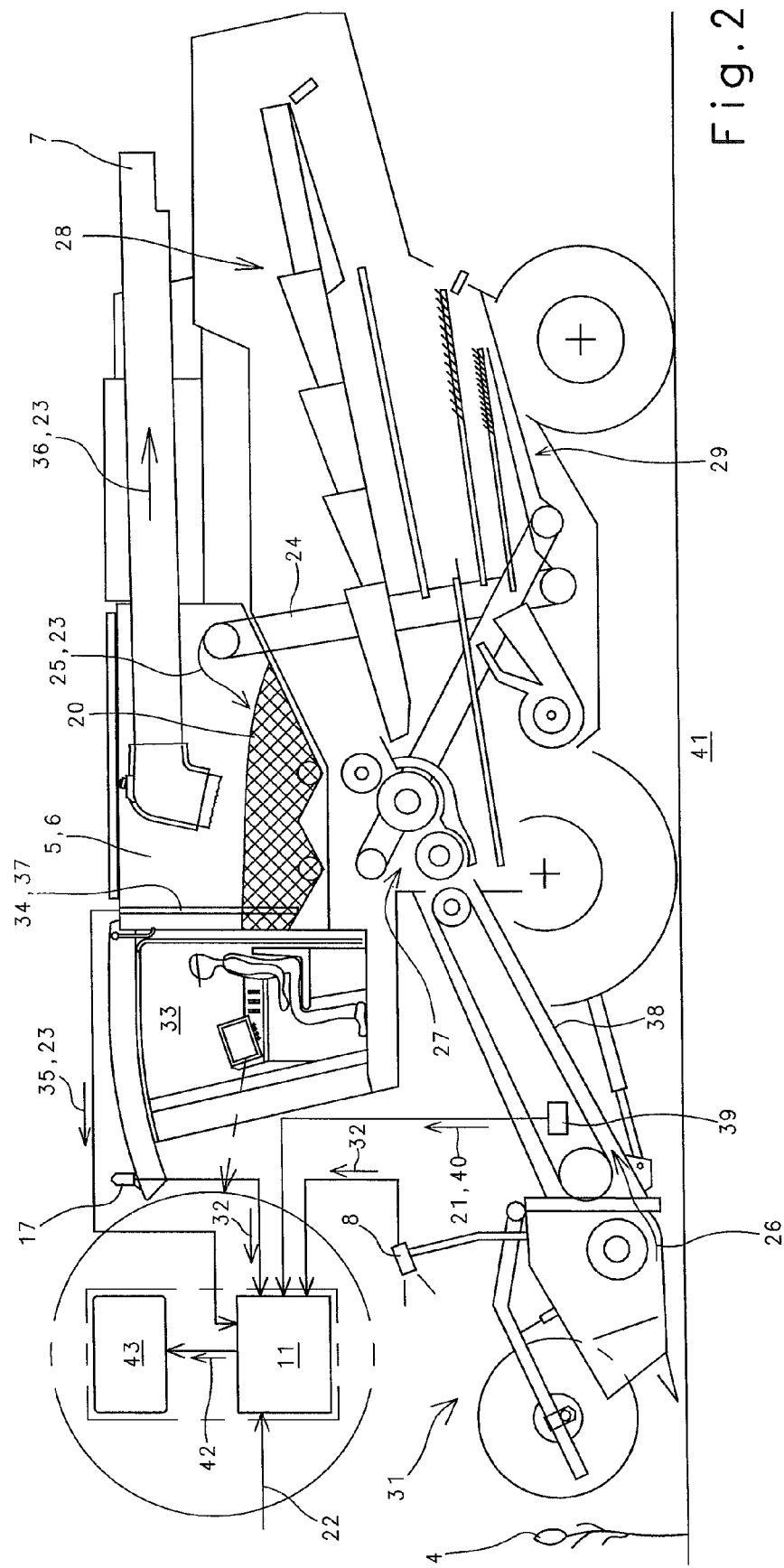
FIG. 2 shows a schematic representation of a combine harvester, in a side view.

In an inventive manner, crop material quantity 20 stored in particular crop material storage unit 6 will be reconciled in a manner to be described in greater detail depending on characteristic parameters, and the reconciliation is adjusted dynamically—in a manner to be described in greater detail—to changes in the characteristic parameter(s). The characteristic parameters of the reconciliation can be crop material-specific parameters 21, field-specific parameters 22 and/or machine-specific parameters 23. According to FIG. 2, combine harvester 2 includes a crop material storage unit 6, which is designed as a grain tank 5, to which a grain flow 25 is delivered via an elevator unit 24. This grain flow 25 results—in a manner which is known per se and is therefore not described in greater detail—from a crop material flow 26; to this end, crop material flow 26 typically passes through threshing parts 27, separating units 28, and cleaning units 29.

Crop material flow 26 is generated by harvesting and combining a grown crop 4 in a header. Combine harvester 2 shown in FIG. 2 also includes previously-described crop edge detection device 8 and GPS system 17 which generate crop edge signals and driving route signals 32 in a manner known per se. For simplicity, the two systems 8, 17 are shown on the same combine harvester 2. Typically, combine harvester 2 can be equipped with only one of these systems 8, 17. Crop edge and driving route signals 32 which are generated are transmitted to evaluation unit 11, which is typically located in driver's cab 33. In addition, grain tank 5 includes a fill level detection device 34 which is known per se; it generates a grain tank fill level signal 35 and transmits it to evaluation unit 11.

It is within the scope of the present invention that fill level detection device 34 is also designed as a sensor device which measures grain throughput; the throughput sensors are integrated in grain elevator 24 and in unloading device 7. In this case, the fill level of grain tank 7 would result from the difference between incoming grain flow 25 and grain flow 36 which is removed from grain tank 5 via unloading device 7. In the exemplary embodiment shown, fill level detection device 34 is therefore composed of inventive sensors 37 for determining crop material quantity 20 stored in grain tank 5. Grain tank fill level signals 25, 35, 36 generated by fill level detection unit 34 are also machine-specific parameters 23, according to the present invention.

A throughput and moisture measurement device 39—which is known per se and will therefore not be described in greater detail—is assigned to feed rake 38 and detects the throughput and moisture content of crop material flow 26 entering feed rake 38 which accommodates header 31 of combine harvester 2. Throughput and moisture signals 40 generated by throughput and moisture measurement device 39 are also transmitted to evaluation unit 11 and simultaneously represent crop material-specific parameters 21, according to the present invention. It would also be feasible, however, for crop material-specific parameter 21 to be the crop material type; this information can then be entered directly in evaluation unit 11 by the operator of combine harvester 2, or evaluation unit 11 can obtain this information automatically from external data sources.

It is also within the framework of the present invention for evaluation unit 11 to include crop-specific parameters 22, such as the geometry of territory 3 to be worked, driving routes 14 generated by combine harvester 2 or a route planning system 15, slopes on ground 41 to be traversed, and the location of obstacles. With regard for crop-specific parameters 22, it is also possible for parameters 22 described to be entered by the operator of combine harvester 2 or to be obtained from external sources. It is also within the scope of the present invention that evaluation unit 11 takes into account only a few or a combination of certain available parameters 21-23.

Evaluation unit 11 is designed, at the least, such that it takes not only grain tank fill level signals 25, 35, 36 into account, but also at least one further characteristic parameter 21-23 and, based on its correlation with grain tank fill level signals 25, 35, 36, generates at least one bit of information 42 which reconciles a crop material quantity 20 stored in grain tank 5. In the simplest case, the bit of reconciling information 42 can be a forecast of expected crop material yields or the determination of an unloading position of combine harvester 2—which will be described in greater detail below—at which crop material quantity 20 is removed from grain tank 5 using unloading device 7. Evaluation unit 11 also includes a display unit 43 in order to better visualize the generated bit of information 42 with which crop material quantity 20 is reconciled.

Figure 3:
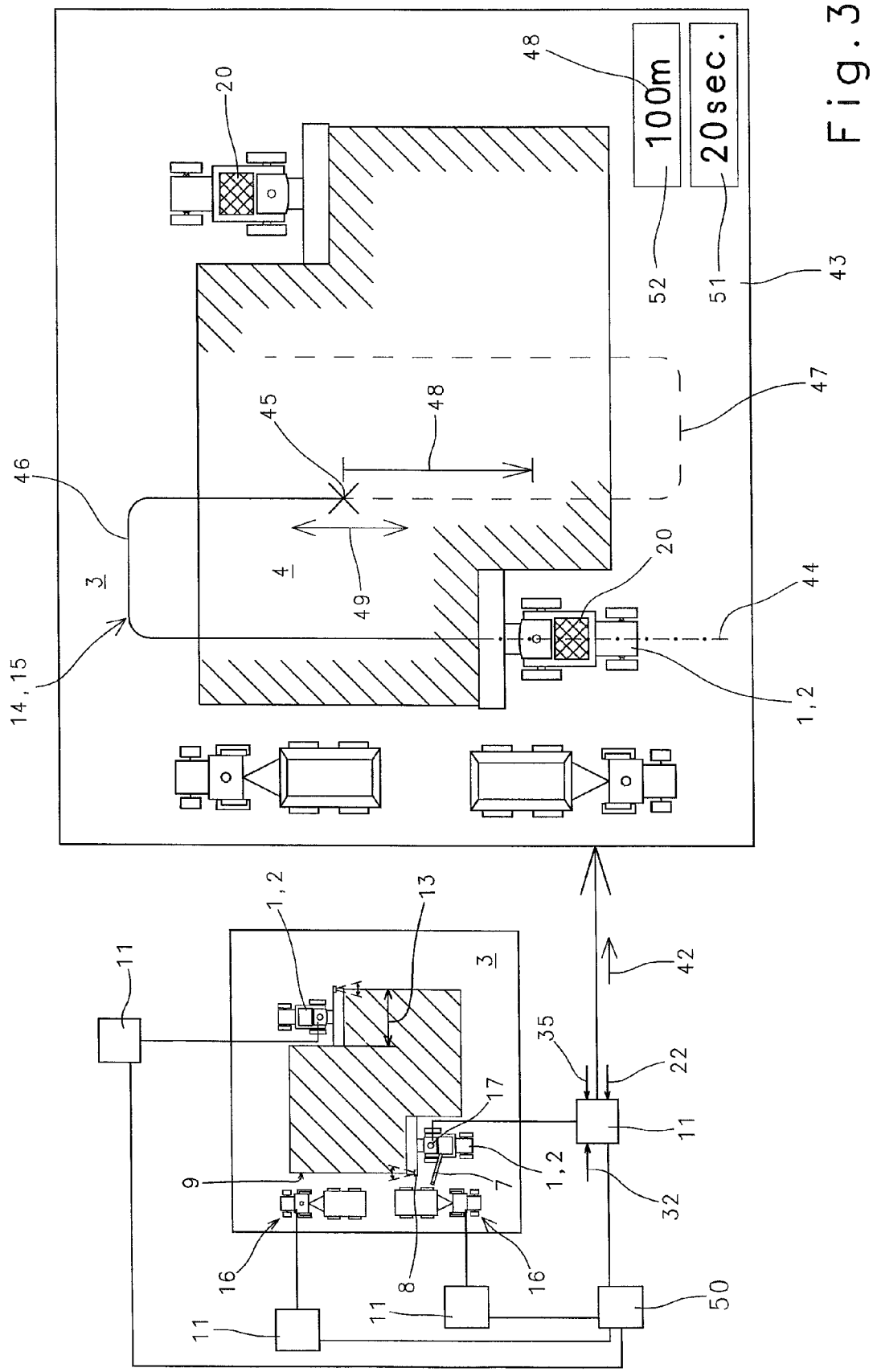
FIG. 3 shows a schematic, detailed depiction of the route planning system according to the present invention.

FIG. 3 shows inventive route planning system 15 in detail. For simplicity, the present invention is described essentially with reference to display unit 43, which is shown greatly enlarged. In display unit 43, combine harvester 2 is performing a harvesting operation in crop 4. Combine harvester 2 can be oriented at crop edge 9 using crop edge detection device 8 or in a GPS-based manner using GPS antenna 17. A first driving track 44 is generated in evaluation unit 11 depending on driving route signals 32. First driving track 44 is depicted using dashed lines in display unit 43 in the exemplary embodiment shown. This driving track 44 also has the property that it represents the harvesting path already covered by combine harvester 2.

In the manner described previously, suitable systems generate at least one grain tank fill level signal 35, based on which a bit of information 42 with which crop material quantity 20 is reconciled is generated in evaluation unit 43. In the case shown, information 42 includes the position of an unloading point 45 in territory 3 to be worked. In display unit 43, the driving path to this unloading point 45 is visualized using a solid driving track 46. Driving route 14 to be worked after unloading point 45 has been reached can be depicted using dashed lines, for instance, so that the property of this further driving track 47 is also visualized using a special graphical shape.

Since the unloading process typically proceeds such that unloading vehicle 16 is driven toward combine harvester 2 or combine harvester 2 is driven toward unloading vehicle 16 to unload grain tank 5, it must be ensured that unloading vehicle 16 can accompany driven combine harvester 2, or that unloading vehicle 16 is positioned such that combine harvester 2 can reach unloading vehicle 16 and transfer its load to it. This is ensured in a manner according to the present invention by the fact that at least one crop-specific parameter 22 is taken into account during generation of information 42 with which crop material quantity 20 is reconciled.

In this case, this can be, e.g., remaining distance 48 required for grain tank 5 to be completely emptied when combine harvester 2 is driven, without the unloading vehicle colliding with obstacles or without the end of crop 4 or territory 3 being reached. In this manner, a continual unloading process is attained, which reduces or nearly completely prevents unproductive standstill times from occurring during the process of unloading combine harvester 2. It is within the scope of the present invention that the position of unloading point 45 and, therefore, the contents of generated information 42 are dynamically adaptable to changing grain tank fill level signals 35 and crop material-specific, crop-specific and machine-specific parameters 21-23. That is, the position of unloading point 45 can be displaced dynamically in arrow direction 49; the position of generated driving tracks 46, 47 can therefore also be changed dynamically.

In an embodiment of the present invention, an unloading point in time 51 can be determined in addition to or instead of the determination of unloading point 45, and it can be visualized in display unit 43. In the simplest case, unloading point in time 51 is determined in evaluation unit 11 based on the ground speed of combine harvester 2 and the increase in crop material quantity 20 in grain tank 5. Due to the gradual increase in crop material quantity 20 in grain tank 5, unloading point in time 51 displayed progresses toward zero. It is also within the scope of the present invention that remaining distance 48 which combine harvester 2 probably needs to cover to reach the unloading point is displayed numerically in a display window 52. In the simplest case, evaluation unit 11 determines the length of remaining distance 48 based on the ground speed of combine harvester 2, crop material quantity 20 stored in grain tank 5, and the conveying speed of unloading device 7.

This value is also adapted dynamically to the current fill level of grain tank 5. It is also within the scope of the present invention that remaining distance 48, unloading point in time 51 and unloading point 45 can be displayed individually or in combination in display unit 43. Since the determination of unloading point 45 and unloading point in time 51 and remaining distance 48 are based on the fill level of grain tank 5, evaluation unit 11 first forecasts the fill level "grain tank full" based on the grain yield which was determined; it is determined in a manner known per se based on the ground speed of combine harvester 2, its working width 13, and grain flow 25 which is determined per unit time and is conveyed into grain tank 5. Depending on further grain flow 25 conveyed into grain tank 5 and grain flow 36 which is optionally removed therefrom, evaluation unit 1 updates the values for unloading point 45, unloading point in time 51 and remaining distance 48.

Since an optimal unloading process is characterized, in particular, by the fact that crop 4 is harvested continually and the vehicle systems used in the harvesting process are moved as little as possible over the territory to be worked, in order to protect the ground, inventive route planning system 15 can also be designed such that evaluation unit 11 defines an unloading strategy—with consideration, at the least, for the fill level of grain tank 5, unloading point 45 which was determined, the position of at least one unloading vehicle 16, and a driving route 14 which has been determined—which adjusts at least one of these parameters depending on the remaining parameters. This has the particular advantage that route planning system 15 takes all essential influential factors of a "harvesting process chain" into account.

Inventive reconciliation process can also be designed such that information 42 which has been generated includes crop material quantity 20 to be expected in crop 4 which has been worked, and the capacity of unloading vehicles 16 required therefore. In the exemplary embodiment shown, this could be designed such that several combine harvesters 2 are used in the same territory 3, and the reconciliation of the unloading capacity takes into account the waiting period experienced by unloading vehicle 16 when a combine harvester 2 is ready to be unloaded. In this manner, it is ensured for a large number of combine harvesters 2 used in the same territory 3 that the unloading capacity is distributed such that a standstill of combine harvesters 2 is prevented, as are unloading positions which are difficult or impossible to reach. This "waiting time reconciliation" can also take an optimization criterium into account. As described above, the optimization criterium can be "short driving distances of unloading vehicle 16 on territory 3 to be worked" and/or "optimal filling of unloading vehicle 16" and/or "prioritization of agricultural working machine 1 to be approached".

According to FIG. 3, a large number of combine harvesters 2 and unloading vehicles 16 can be involved in the harvesting process. It is within the scope of the present invention that further agricultural working machines 1 can be integrated in the process chain. Given that each combine harvester 2 and every unloading vehicle 16 includes an evaluation unit 11 with associated display unit 43, and every evaluation unit 11 is in contact with a central unit 50, which is located on one of the participating vehicles 1, 2, 16 or is stationary at a central location, the control of one or more unloading vehicles 16 can be carried out automatically depending on one or more generated unloading points 45. This coordinated motion of unloading vehicles 16 and combine harvester 2 on a territory 3 to be worked can also be further optimized when each of the evaluation units 11 includes a display unit 43, in which vehicles 1, 2, 16—which are also incorporated in inventive route planning system 15—are displayed.

It lies within the abilities of one skilled in the art to modify route planning system 15 described above in a manner not shown or to use it in other machine systems to obtain the effects described, without leaving the scope of the present invention.

It will be understood that each of the elements described above, or two or more together, may also find a useful application in other types of constructions differing from the type described above.

While the invention has been illustrated and described as embodied in a route planning system for agricultural working machines, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A route planning system for an agricultural working machine including at least one crop material storage unit for storing quantities of crop material transferable to forage vehicles, the route planning system comprising an evaluation unit configured for generating driving routes in a territory based on a defined working width assigned to the agricultural working machine and for reconciling a crop material quantity stored in the crop material storage unit depending on at least one characteristic parameter selected from the group consisting of a crop material-specific parameter, a field-specific parameter, a machine-specific parameter, and a combination thereof; and a fill level detection device for measuring grain throughput, for measuring a grain fill level difference between incoming grain flow and grain flow removed from crop material storage, for generating a crop material fill level signal representative of the grain fill level difference and for transmitting the crop material storage fill level signal to the evaluation unit;

wherein said evaluation unit dynamically adapts the reconciliation to changes in the at least one characteristic parameter.

2. A route planning system as defined in claim 1; and further comprising sensors which sense the crop material quantity stored in the crop material storage unit; and an evaluation unit in which signals specific to the crop material quantity generated by said sensors are correlated with at least one of the characteristic parameters provided in said evaluation unit so that said evaluation unit generates information which is used to reconcile the crop material quantity.

3. A route planning system as defined in claim 2, wherein said evaluation unit is configured so that the information which is generated by said evaluation unit and used to reconcile the crop material quantity includes an information selected from the group consisting of expected crop material yields, expected unloading points, an unloading point in time, a remaining distance over which the crop material quantity is conveyed out of the crop material storage unit, and a combination thereof.

4. A route planning system as defined in claim 1, wherein said means for reconciling is formed so that the reconciliation includes a determination of a current grain tank fill level and forecasting a geographical position of an unloading point in the route planning system with consideration for at least one field-specific parameter.

5. A route planning system as defined in claim 2, wherein said evaluation unit is configured so that it determines, with consideration at least for a fill level of the crop material storage unit, an unloading point which was determined, a position of at least one unloading vehicle and a determined driving route, an unloading strategy which adjusts at least one of these parameters depending on remaining parameters.

6. A route planning system as defined in claim 1, wherein said means for reconciling is configured so that the reconciliation includes stating what additional unloading capacity is required, depending on a crop material quantity expected.

7. A route planning system as defined in claim 6, wherein said means for reconciling is configured so that the unloading capacity required is provided as a waiting-time reconciliation such that, depending on a fill level of the crop material storage unit and/or an unloading point which was determined, at least one unloading vehicle which forms the unloading capacity switches between a large number of agricultural working machines with consideration for an optimization criterium for storing crop material.

8. A route planning system as defined in claim 7, wherein said means for reconciling is configured so that the optimization criterium is a criterium selected from the group consisting of a short driving distance of the unloading vehicle on a territory to be worked, an optimal filling of the unloading vehicle, a prioritization of the agricultural working machine to be approached, and a combination thereof.

9. A route planning system as defined in claim 1; and further comprising means for controlling of one or more unloading vehicles automatically depending on at least one determined unloading point.

10. A route planning system as defined in claim 1; and further comprising at least one graphic display unit for visualizing an unloading point which was determined and provided in the agricultural working machine and at least one unloading vehicle.

11. A route planning system as defined in claim 10, wherein said graphical display unit is configured so that it depicts driving tracks, and the driving tracks are depicted depending on driving path properties.

12. A route planning system as defined in claim 11, wherein said graphical display unit is configured so that a graphical display of the driving tracks includes, at least, a depiction of a worked driving track and a driving track yet to be worked, which depends on the unloading point which was determined.

13. A route planning system as defined in claim 1, wherein said evaluation unit is configured so that the crop material-specific parameters include parameters selected from the group consisting of a crop material type, a crop material moisture, a crop material throughput, a grain throughput, a grain-straw ratio, and a combination thereof.

14. A route planning system as defined in claim 1, wherein said evaluation unit is configured so that the field-specific parameters include parameters selected from the group consisting of field geometry, driving routes, hilly terrain, a location of obstacles, and a combination thereof.

15. A route planning system as defined in claim 1, wherein said evaluation unit is configured so that the machine-specific parameters include parameters selected from the group consisting of a fill level of the crop material storage unit, a crop material quantity delivered to the crop material storage unit, a crop material quantity unloaded from the crop material storage unit, specific information about at least one unloading vehicle, and a combination thereof.

16. A route planning system as defined in claim 11, wherein said graphic display unit is configured so that a display of driving tracks is adapted dynamically to changing basic conditions.

17. A route planning system as defined in claim 1; and further comprising a display unit for visualizing an unloading point, an unloading point in time, and a remaining distance in a manner selected from the group consisting of individually and in combination.

18. A route planning system as defined in claim 1; and further comprising means for dynamically adjusting an unloading point, an unloading point in time, and a remaining distance.

19. A route planning system for an agricultural working machine including at least one crop material storage unit for storing quantities of crop material transferable to forage vehicle, the route planning system comprising: an evaluation unit configured for generating driving routes in a territory based on a defined working width assigned to the agricultural working machine for correlating signals generated by crop material sensors that are specific to a crop material quantity stored in the crop material storage unit with at least one characteristic parameter selected from the group consisting of a crop material specific parameter, a field-specific parameter, a machine-specific parameter, and a combination thereof, a fill level detection device for measuring grain throughput, for measuring a grain fill level difference between incoming grain flow and grain flow removed from crop material storage, for generating a crop material fill level signal representative of the grain fill level difference and for transmitting the crop material storage fill level signal to the evaluation unit, and for reconciling a crop material quantity store in the crop material storage unit depending on at least one characteristic parameter selected from the group consisting of a crop material-specific parameter, a field-specific parameter, a machine-specific parameter, and a combination thereof; wherein said evaluation unit dynamically adapts the reconciliation to changes in the at least one characteristic parameter.

\* \* \* \* \*